United States Patent [19]
Schmidt et al.

[11] Patent Number: 5,287,348
[45] Date of Patent: Feb. 15, 1994

[54] TELECOMMUNICATION NETWORK

[75] Inventors: Lothar Schmidt, Fuerstenfeldbruk; Alfred Jugel, Geretsried, both of Fed. Rep. of Germany; Andy Mallinson, Poole, Great Britain; Peter Rau, Munich, Fed. Rep. of Germany

[73] Assignees: Siemens Aktiengesellschaft, Munich, Fed. Rep. of Germany; GPT Limited Coventry, London, England

[21] Appl. No.: 932,317

[22] Filed: Aug. 19, 1992

[30] Foreign Application Priority Data

Aug. 19, 1991 [EP] European Pat. Off. ........ 91307637.8

[51] Int. Cl.$^5$ ........................................... H04L 12/56
[52] U.S. Cl. ................................. 370/60.1; 370/94.2
[58] Field of Search ............... 370/53, 60, 60.1, 79, 370/94.1, 94.2, 99, 49.5, 56

[56] References Cited

U.S. PATENT DOCUMENTS 5,168,492 12/1992 Beshai et al. ................... 370/60.1
5,204,857 4/1993 Obara ............................ 370/60.1

FOREIGN PATENT DOCUMENTS 0225714 6/1987 European Pat. Off. .
0354120 2/1990 European Pat. Off. .
0365693 5/1990 European Pat. Off. .

OTHER PUBLICATIONS

"Meilenstein in der Vermittlungstechnik", Trends in der Telekommunikation Telcom Report, No. 6, Nov./Dec. 1989 pp. 181-183.

"Synchronous & Asynchronous Transfer modes in the Future Broadband ISDN", by Schaffer, IEEE International Conference on Communications, (1988), pp. 1552-1558.

"High-speed Packet Switching Systems for Multimedia Communications", by H. Ichikawa, IEEE Journal on Selected Areas in Communications, No. 8, (1987), pp. 1336-1345.

"Wideband Packet Technology For Switching Systems", by Luderer et al IEEE Communications Society, Mar. 15-20, 1987, pp. 0448-0454.

Primary Examiner—Benedict V. Safourek
Attorney, Agent, or Firm—Hill, Steadman & Simpson

[57] ABSTRACT

The telecommunication network is composed to a greater extent of ATM exchanges and to a lesser extent of STM exchanges. For reducing the packeting time for the through-connection across the ATM exchange, information coming from an STM exchange and to be switched via an ATM exchange to a further STM exchange is packeted either into message cells that are shorter in comparison to standardized message cells used for the transmission between ATM exchanges or into message cells of the same length wherein, however, respective message parts of a plurality of STM channels that are to be through-connected to the same ATM output are multiplexed in a message cell. Given local exchanges (ATM-V) having decentralized line units (SLUR) for the connection of subscriber lines, the message cells of a plurality of STM channels are packeted multiplexed thereat without taking the exchange destination into consideration. A conversion into one of the aforementioned message cells that deviate from the standard cells then occurs in the exchange.

17 Claims, 4 Drawing Sheets

TELECOMMUNICATION NETWORK

BACKGROUND OF THE INVENTION

The present invention is directed to a telecommunication network having switching centers that to a greater extent operate on the basis of asynchronous through-connection of message packets in message cells of fixed length via virtual connections (ATM exchanges) and to a lesser extent operate on the basis of synchronous circuit-switched through-connections (STM exchange), and whereby at least one of the ATM exchanges has connection possibilities for transmission lines connected to STM exchanges in addition to its fashioning as an ATM exchange (ATM tandem exchange) or has connecting possibilities for both transmission lines and subscriber lines connected to terminal equipment (STM terminal equipment) that transmit and receive information in the STM mode (ATM local exchange).

Such a telecommunication network is to be understood as a transitional stage to future telecommunication networks wherein the asynchronous transfer mode (ATM) is employed throughout. By contrast to currently installed telecommunication networks, which operate in the synchronous transfer mode (STM), telecommunication networks operating in the ATM mode have a significant advantage. The available transmission capacity of a transmission channel can be flexibly utilized for a multitude of services such as voice, data, image transmission and can thereby be allocated to a single service or to a plurality of services dependent on time and need.

The introduction of a universal telecommunication network on an ATM basis can only be successful when the possibility of cooperation is economically possible of previously existing telecommunication networks operating on an STM basis and executing 64 Kb/s voice services with new switching centers operating on an ATM basis.

A hybrid solution for a telecommunication network has been proposed in this context which provides three functionally separate system components at the exchanges. First is what is referred to as a cross connector for the connection of transmission lines via which information is transmitted at higher bit rates, for example 2 Mb/s, in STM mode, this essentially assuming the function of an electronic main distributor. Second is a narrowband exchange that corresponds in practice to current narrowband exchanges for the connection of central office lines and transmission lines for information transmitted on an STM basis with a bit rate of 64 Kb/s. Finally, third is a broadband exchange that operates on an ATM basis, i.e. as a packet exchange having message cells of fixed length and for setting virtual connections. Each of the three system components of the exchanges of such a hybrid network have separate line units and a separate switching network. Of course, such a solution is extremely cost and maintenance intensive.

By contrast, in the initially described telecommunication network, universal network nodes operating on an ATM basis are provided. With on-going network expansion, the number of these should dominate more and more over network nodes operating on an STM basis and should ultimately be present as the only type of network node. These universal network nodes have only a single ATM switching network for all three types of connection or, respectively, employment of the hybrid telecommunication system.

In order to be able to process information that is incoming on an STM basis, these must be packeted in ATM message cells in interface units and must be in turn depacketed after passing through the switching network and be superimposed into addressed time slots, to which end the appertaining interfaces have packeting/depacketing means.

Since such a universal network node is provided with a uniform switching network, uniform interfaces and a central controller and also operates with uniform pathfinding and uniform maintenance functions, lower capital costs and lower outlay for maintenance result as compared to the aforementioned hybrid solution. Moreover, expandability is established without particular outlay in the basic equipment.

As presented, the STM messages must be packeted in ATM message cells in order to also be able to process STM messages in such a universal ATM network node.

The format of such ATM message cells is already largely defined, whereby a useful information field that covers 48 time slices covering 8 bits each, what are referred to as octets, is provided per message cell in addition to a message header. At least one of these can be utilized for further particulars about, for example, the nature of the message cell.

For packeting the samples of a time channel respectively coded with 8 bits for transmission of 64 Kb/s voice information, the chronological duration of 47 sampling pulse frames is required in this case, so that a packeting time of $48 \times 125$ $\mu$s$=6$ ms is required together with the one octet. With jitter compensation, the depacketing requires approximately 0.25 ms, so that a time delay of 6.25 ms arises overall in the transmission in one direction.

In current digital telephone networks, approximately 1.5 ms are allowed for local exchanges as transit times within the exchanges that mainly arise due to the analog-to-digital conversion or digital-to-analog conversion. Approximately 1.0 ms per transmission direction are allowed for tandem switching centers, so that an allowable overall transit time of at most 15 ms per transmission direction results for a network in which a connection runs by a maximum of 3 local exchanges and a maximum of 6 tandem switching centers given a maximum distance of approximately 1000 km.

The maximum delay time allowed in Great Britain is only 12.5 ms, whereas in the U.S., it is 17.5 ms per transmission direction. The demands made with respect to adhering to transit time limits serves the purpose of assuring the voice quality, since longer transit times lead to noticeable echo effects because of the reflections of the voice signals at the hybrid circuits in the subscriber terminal equipment of the listening subscriber.

The aforementioned delays of 6.25 ms arising in conjunction with the packeting/depacketing procedure are thus approximately 5 ms greater than the required transit time limit for exchanges.

In order to assure the required voice quality under these conditions, separate echo compensators must be utilized per transmission direction. However, over and above this, care would also have to be exercised to ensure that a plurality of network transitions whereat the aforementioned delay due to packeting/depacketing procedures respectively arises, are avoided in voice connections since a compensation of transit time on the order of the required magnitude for a plurality of network transitions can no longer be governed with echo compensators. This, however, would require an involved intermeshing between the STM exchanges of the STM network that still exists and the ATM exchanges that are intended to be the basis for the future universal network.

For the purpose of reducing the delay times in the packeting of STM voice information that is transmitted with a transmission rate of 64 Kb/s, it has therefore been proposed in conjunction with a telecommunication network of the type initially described to only partially occupy the message cells of fixed length in the ATM system with STM messages (European Patent Application 88 11 57 25.9). Such a procedure, of course, means a poor exploitation of the transmission capacity. In order to provide a certain amount of compensation, it has also been proposed in the patent application to respectively define the degree of occupation of the message cells during call set up in call-associated fashion in accord with the call set up information co-transmitted during the call set up and to keep this low for long-distance connections that proceed via a plurality of exchanges but to allow a higher degree of filling for connections in the local area.

It is precisely in long-distance connections, however, that a high bit rate is particularly desirable for economical reasons, since the proportion of the costs for the transmission technology outweighs those for the exchanges. Apart therefrom, of course, the measures for improving the exploitation of the transmission capacity also require a considerable outlay in terms of control.

SUMMARY OF THE INVENTION

It is an object of the present invention to provide a telecommunication network of the type initially described such that echo compensators and involved intermeshing structures required in the prior art for voice quality are largely avoided and a significant reduction in the degree of utilization of the existing transmission capacity is nonetheless acceptable for useful information, that is, voice information in this case, whereby, in particular, the connecting conditions in local exchanges are taken into consideration.

This object is inventively achieved by a telecommunication network having a plurality of switching centers composed of ATM exchanges and STM exchanges, the ATM exchanges of the plurality of switching centers operating on the basis of asynchronous through-connection of message packets in standard message cells of fixed length via virtual connections and the STM exchanges of the plurality of switching centers operating on the basis of synchronous circuit-switched through-connection. At least one predetermined ATM exchange of the ATM exchanges is capable of being connected to transmission lines connected to STM exchanges and/or subscriber lines connected to terminal equipment transmitting and receiving STM information in a STM mode, the STM information being in a plurality of time channels. The predetermined ATM exchange has means for packeting received STM information having a destination of one of an STM exchange or STM terminal equipment in short message cells that are shorter than standard message cells transmitted between ATM exchanges of the plurality of switching centers, each short message cell having at least an information part containing message parts of one of the incoming time channels wherein the STM information is transmitted. The predetermined ATM exchange also has means for packeting received STM information having a destination of one of an STM exchange or STM terminal equipment in composite message cells that have the same length as the standard message cells transmitted between ATM exchanges of the plurality of switching centers, each composite message cell having at least an internal cell header and having an information part containing message parts of a plurality of incoming time channels that have a common destination of a switching network output of the predetermined ATM exchange, and means for multiplexing the message parts into the information part of the composite message cell. A separate line unit from the predetermined ATM exchange interconnects a plurality of subscriber lines carrying STM information to a multiplex line, the multiplex line being connected to the predetermined ATM exchange. The separate line unit has means for packeting STM information received on the subscriber lines in external message cells that have the same length as the standard message cells, each of the external message cells having at least an information part containing message parts of a plurality of time channels in which the STM information is transmitted. The separate line unit also has means for multiplexing the message parts into the information part of the external message cell irrespective of switching network output destinations of the STM information in the plurality of time channels. The predetermined ATM exchange further has converter means connected to the multiplex line for converting the external message cells into one of the short message cells, the composite message cells with multiplexed sub-information of time channels having a common destination, and the standard message cells.

The telecommunication network of the invention thus operates with different message cells in conjunction with the through-connection of STM messages through the switching network of an ATM exchange. Insofar, namely, as the STM information is to be transmitted via an ATM exchange to another STM exchange, message cells are formed that either have less length than the standard message cell or are message cells wherein sub-information is packeted multiplexed that are to be through-connected to the same switching network output allocated to a specific exchange destination direction. In both cases, the packeting delay time is shorter than when filling a standard message cell with sub-information of a single time channel. Good utilization of the transmission capacity is also achieved in the second version with beneficial connection conditions.

The connection conditions at local exchanges whereat a plurality of subscriber lines respectively carrying STM information are connected to a multiplex line leading to the exchange by a line unit separate from the exchange are somewhat disadvantageous insofar as a greater plurality of connections having the same exchange destination ar normally not simultaneously conducted via such a line unit. As a result longer waiting times than desired must be accepted in the second version for the filling of the message cells or partially filled cells must be transmitted after prescribed waiting times. Since, on the other hand, the retention of the cell length of standard cells as provided in the second version yields advantages, a further cell type is used according to a further feature of the present invention given the described connection situation of a local exchange. This is namely a type wherein, as in the aforementioned version, sub-information of a plurality of time channels is packeted multiplexed in a message cell. However, this is undertaken without taking an exchange destination into consideration, so that the packeting time is largely independent of the occupancy conditions at the subscriber lines connected to the line unit and a resorting into message cells wherein sub-information of channels that have the same exchange destination direction are multiplexed. Alternatively, on the other hand, in message cells having the specified length that is shorter in comparison to standard cells the pocketing is initially undertaken in the interface region of the exchange where a concentration occurs of the traffic of multiplex lines coming together from a plurality of line units.

In a development of the present invention, the equipment allocated to the decentralized line units, which are composed of packeting/depacketing means and of a multiplex cell generator, are a constituent part of these decentralized line units. Thus, a centralization of the cell formation for the information appearing on the plurality of connected subscriber lines is established.

However, according to another development of the present invention, the equipment allocated to the decentralized line units is also composed of a plurality of packeting/depacketing means and of a plurality of cell generator means, each of which is a respective constituent part of function units individually allocated to the subscriber lines. Thus, in this case, an ATM operation already occurs between the function units and the line unit.

Dependent on the version of the embodiment according to further developments of the present invention, the cell generating in the function units can be a matter of generating multiplex cells, wherein sub-information of a plurality of time channels is multiplexed without taking the exchange destination into consideration in the same manner as on the multiplex line between line unit and exchange. Alternatively, it can be a matter of short cells or message cells that in fact have the same length as standard cells but whose message part is only partially filled.

The decision as to which of the versions is to be preferred depends on the traffic conditions or depends on whether reducing the packeting delay or optimum cell utilization is given priority.

According to yet another development of the present invention in a version wherein the packeting/depacketing means is centrally contained in the decentralized line unit for a plurality of subscriber lines, this line unit (in addition to having a narrowband switching network working on an STM basis that precedes the packeting-/depacketing means) has a broadband switching network operating o an ATM basis that follows the packeting/depacketing means and the multiplex cell generator. The subscriber lines that lead to broadband subscribers are directly connected to this broadband switching network. The further handling of the broadband subscriber information in the interface area, i.e. the ordering in either short cells or multiplex cells having a uniform exchange destination direction or standard cells (insofar as forwarding to another ATM exchange comes into consideration), occurs in the same manner as in the case of information coming from narrowband subscribers via the narrowband switching network.

Yet other developments of the present invention are directed to the connection of subscriber lines carrying STM information via line units that are not separated from the exchange but represent a constituent part of the ATM local exchange.

As in the case of transmission lines connected to other STM exchanges, either short cells or multiplex cells combined uniformly based on destination direction are formed in equipment allocated to these line units, whereby (similar to the case of the decentralized line units) either the line units themselves or, when the packeting/depacketing means are individually allocated to the connected lines, the function units come into consideration as the location of the circuit parts executing the functions of packeting/depacketing and cell formation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
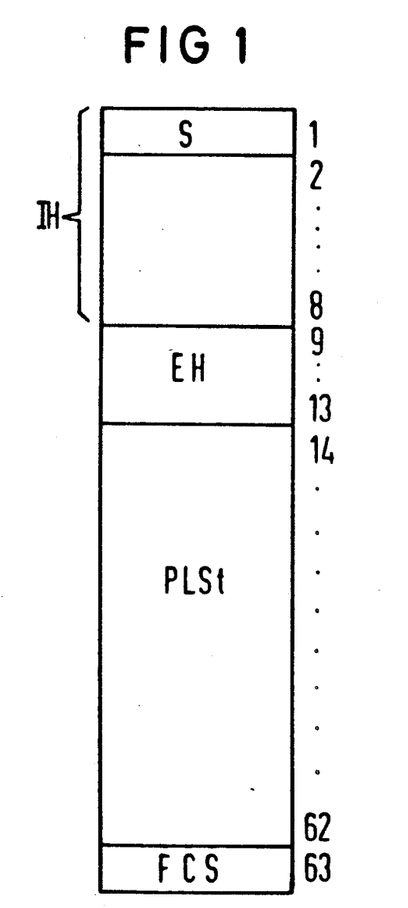
FIG. 1 depicts the format of an internal standard message cell for through-connection by exchanges in ATM telecommunication networks.

The standard message cell according to FIG. 1 has a total of 63 octets, i.e. time slices of respectively 8 bits each. Eight such octets are occupied by an internal cell header IH (internal header) that essentially contains a synchronization octet S, octets containing routing information for the path through the switching network, and one octet for a cell number for identifying the cell sequence. A further cell header, the external cell header EH (external header) covers 5 octets and contains particulars about a virtual channel and a virtual connecting path to which the appertaining message cell is allocated.

This is followed by an information part PLSt covering 48 octets wherein the actual telecommunication information is transmitted. Last is another octet FCS that indicates the cell end.

The aforementioned internal header IH is removed after traversing an exchange before continued transmission of the message cell, so that externally appearing cells are composed only of the external header EH and of the information part PLSt.

Figure 2:
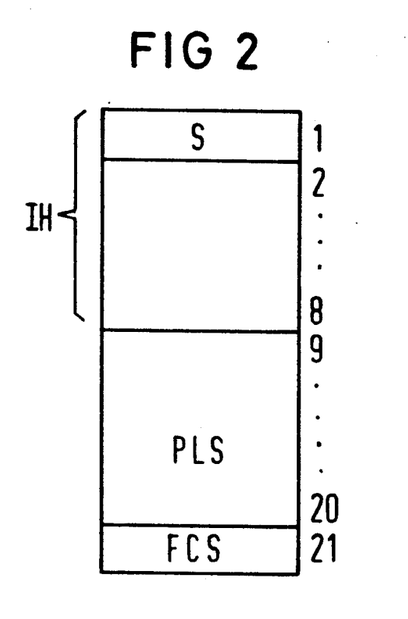
FIGS. 2 and 3 depict the format of message cells inventively used within an ATM exchange for the through-connection of STM messages to STM exchanges.

In the message cell illustrated in FIG. 2, which is inventively used for passage through ATM exchanges given connections between STM exchanges leading via an ATM exchange or between terminal equipment that operate on an STM basis and STM exchanges, only an internal header IH is present since these message cells do not appear outside the ATM exchange. In the illustrated example, it covers 8 octets.

The information part PLS of such a message cell covers only a sub-set of the octets in a standard cell, the packeting time being thus correspondingly reduced. Such an octet of the information part following the internal header contains an indicator to the effect that the appertaining message cell is a short cell and two further octets serve the purpose of indicating the number of the time channel of the STM information and indicating the destination interface via which the STM messages are to be forwarded from the ATM exchange. One octet FCS that follows the information part indicates the end of the cell.

Only one internal header IH which cover 8 octets is likewise present in the message cell shown in FIG. 3, referred to below also as a composite cell, as is alternatively inventively employed for passage through ATM exchanges given an STM exchange or terminal equipment operating on an STM basis as an exchange destination.

The information part PLK of such a message cell is utilized in the illustrated case for the packeted information parts of four time channels, whereby 12 octets are available for every time channel, 8 octets thereof in turn being utilized for the actual channel information. This thus means that a packeting time of 8 pulse frames, i.e. $8 \times 125 \mu s = 1$ ms, arises for generating such a cell and, thus, a value which is likewise still justifiable in view of echo problems.

The other four octets utilized for a time channel contain, among other things, the channel address as well as a potential sequence feature in order to guarantee the proper cell sequence per channel.

Figure 3:
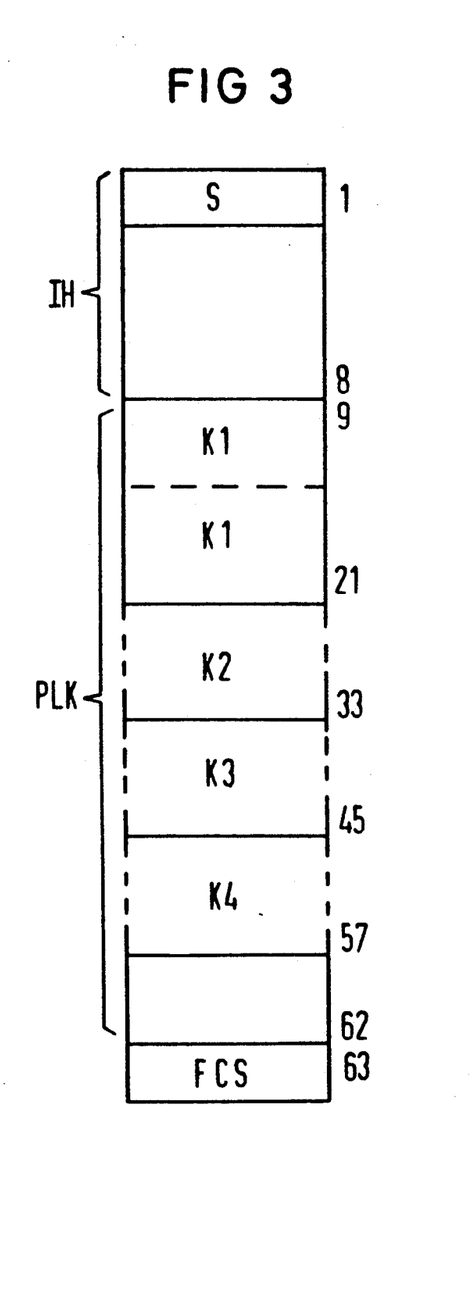

Given the assumed division of the message cell according to FIG. 3, which has the same length as the standard message cell according to FIG. 1, 4 octets remain unused.

However, within the framework of this prescribed length other divisions are also possible. For example, the channel information of 5 time channels can be multiplexed, only 7 octets per time channel than being available for the channel information.

What is important in the occupation of the message cell according to FIG. 3 is that the multiplexed, 4 time channels of a message cell are intended for the same destination direction, i.e. are to be through-connected to the same switching network output of the ATM exchange. The sequence of the channel locations within a message cell as well as the allocation of the channels to message cells that are to be switched to the same switching network output, i.e. to the same destination direction, by contrast, is inventively arbitrary.

In this manner, the dependency of the degree of utilization of the message cells carrying multiplexed channels on the traffic distribution is reduced. The degree of utilization of such message cells is lowest when, given a total of n existing switching network outputs, only one of the incoming time channels is to be switched to n-1 outputs and all other incoming time channels are to be switched to the remaining, one output. In that case only one time channel location is occupied in such a message cell and the three other time channel locations remain free. A traffic distribution that is beneficial in view of the message cell utilization is present when the incoming time channels are to be uniformly distributed onto all switching network outputs.

Figure 4:
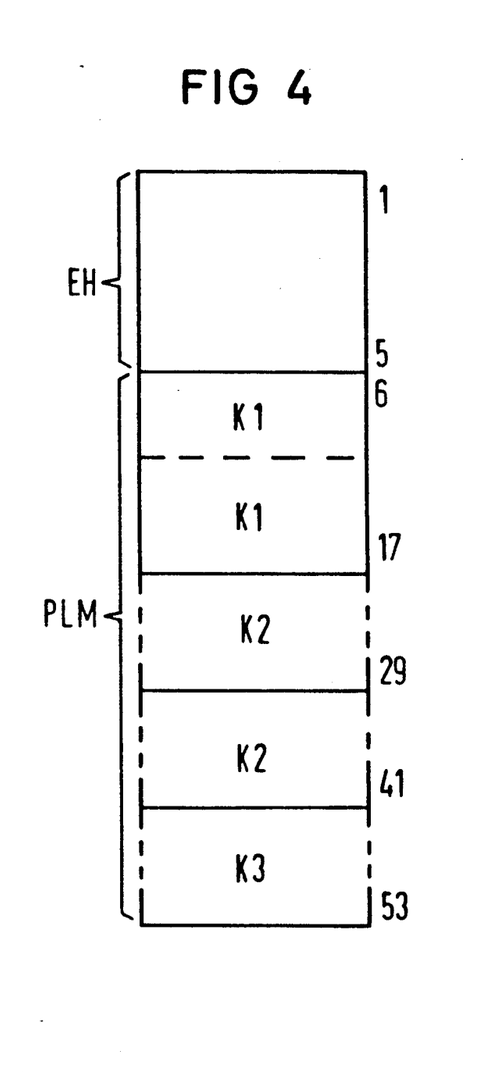
FIG. 4 depicts the format of message cells inventively formed in ATM local exchanges for the transmission between a decentralized line unit for the connection of subscriber lines that carry STM information and the exchange.

The message cells according to FIG. 4 (as are inventively employed on the multiplex connection between decentralized line units for the connection of subscriber lines and an ATM local exchange, i.e. are employed outside the exchange) also have the same length as the standard cells. However, by contrast to the aforementioned message cells according to FIG. 3 they carry an external header EH instead of an internal header IH since they may potentially have to be forwarded via cross connectors instead of being forwarded through the switching network of the exchange.

The message part PLM of the multiplex cells according to FIG. 4, similar to that of the composite cells according to FIG. 3, contains sub-information from four time channels for each of which respectively 12 octets are available, whereby 8 octets thereof are in turn likewise utilized for the actual useful information and 4 octets thereof are available for address information.

Differing from the conditions in the case of the message cells according to FIG. 3, however, the exchange destination direction of the time channels multiplexed in a message cell can be arbitrary, so that the usage of the cells and, thus, the degree of utilization of the transmission capacity is independent of the traffic conditions, i.e. of the number of time channels supplied to the line unit and the number of destinations that can be reached proceeding from the exchange.

As a result of this latter property, significantly shorter waiting times for achieving a high degree of cell filling can be used in the packeting of these multiplex cells when compared to the cells according to FIG. 3.

Figure 5:
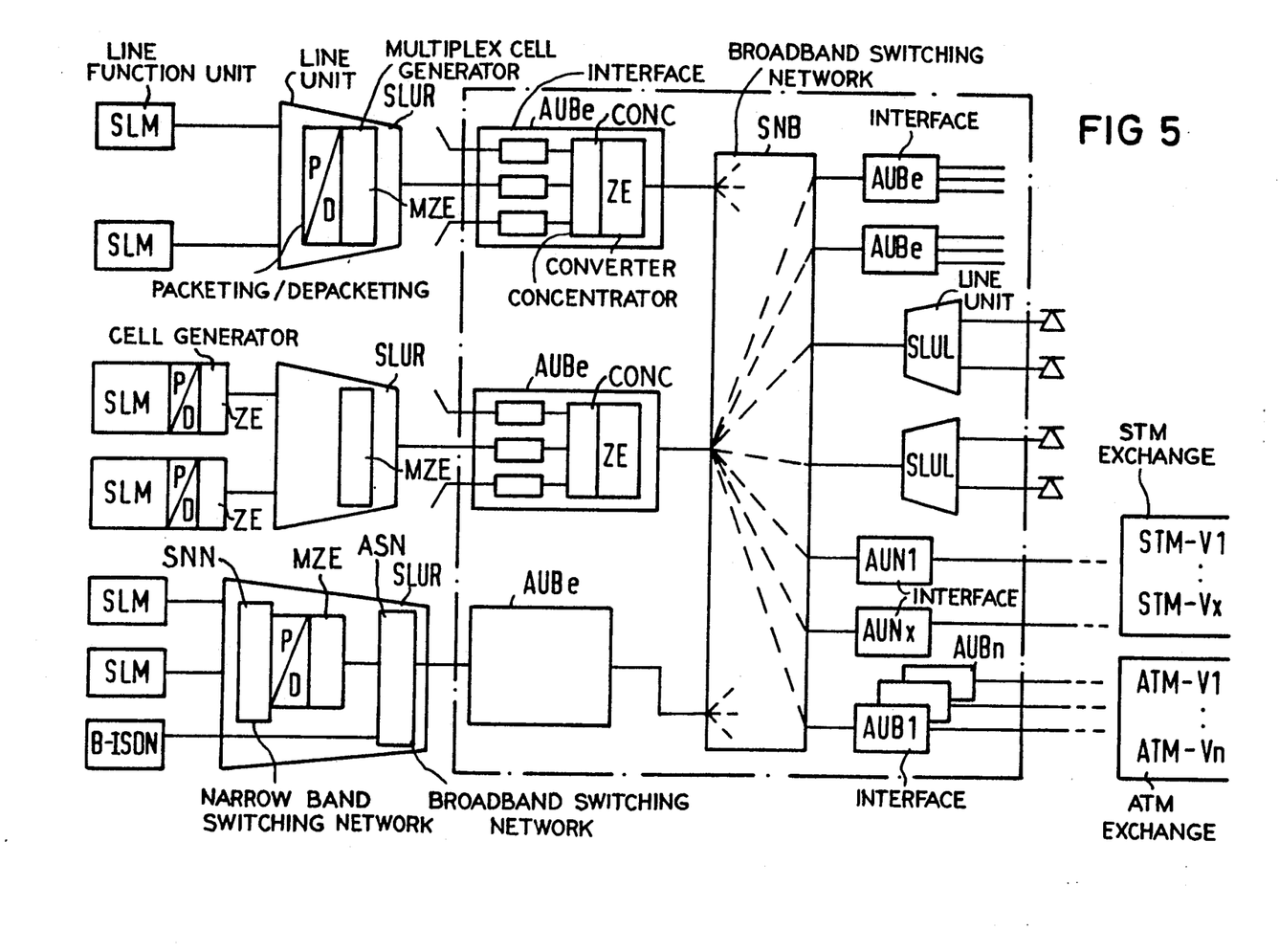
FIG. 5 is a block circuit diagram of an ATM local exchange wherein subscriber lines carrying STM information are connected via decentralized line units.

FIG. 5 shows an inventively structured ATM local exchange connected to terminal equipment operating on an STM basis in addition to terminal equipment operating on a ATM basis (the connection of the terminal equipment not being shown in detail here). The ATM local exchange is in communication with at least one further ATM exchange ATM-V via trunk lines which discharge into interfaces AUB1 through AUBn and which are in communication with at least one STM exchange STM-V via trunk lines that discharge into interfaces AUN1 through AUNx. The connection of the subscriber lines occurs via line-associated function units SLM that are combined by a line unit SLUR separated from the exchange or by a line unit SLUL belonging to the exchange.

The decentralized line units SLUR are in communication with the exchange via multiplex transmission paths that discharge into interfaces AUBe.

A broadband switching network SNB operating on an ATM basis is indicated as a central part of such an ATM local exchange.

As interfaces via which either connections to terminal equipment operating on an STM basis or connections to an STM exchange proceed, the interfaces AUBe and the interfaces AUN through AUNn inventively contain equipment with which message cells are formed in a format of a type used for the through connection to the switching network SNB. The interfaces AUN1 through AUNn via which connections to further STM exchanges STM-V proceed additionally contain packeting/depacketing means.

The packeting and the depacketing in the case of the connection of subscriber lines via decentralized line units SLUR occurs either centrally for all lines connected to such a line unit on the basis of a packeting-/depacketing means P/D contained in this line unit (as indicated in the upper part of FIG. 5) or on the basis of line-associated packeting/depacketing means that are a constituent part of line-associated function units SLM, as indicated in the middle part of FIG. 5.

The line units SLUR contain equipment MZE with which multiplex cells according to FIG. 4 are generated, information coming from the STM terminal equipment being packeting in these multiplex cells. In the case of the version shown in the upper part of FIG. 5, the information transmitted between the function units SLM and the line unit SLUR is still STM information.

In the case of the version shown in the middle of FIG. 5, the function units (in addition to containing the aforementioned, line-associated packeting/depacketing means P/D) contain equipment ZE for cell generating with which either short cells according to FIG. 2, multiplex cells according to FIG. 4 or cells that in fact have the same length as the standard cells but are only partially filled and conform with FIG. 4 but only with the sub-information of a single time channel are formed. In this case, a transmission in ATM mode already occurs between the function units SLM and the line unit SLUR. The equipment MZE in the appertaining line unit SLUR in this case has the job of converting the message cells into multiplex cells.

A further version of the connection of subscriber lines is shown in the lower part of FIG. 5, whereby (as in the case of the line unit SLUR in the upper part of the FIG. 5) the line unit SLUR contains a means P/D for central packeting and depacketing and whereby (in addition to a narrowband switching network SNN operating on an STM basis which is arranged at the line side of the packeting/depacketing means P/D and to which are connected subscriber lines carrying STM information connecting to narrowband subscribers) a broadband switching network ASN operating on an ATM basis is connected to the exchange side of the message cell generator MZE of this line unit. Broadband terminal equipment BISDN carrying ATM information is also connected to this broadband switching network ASN Internal connections between the connected terminal equipment are possible via these switching stages.

The multiplex transmission lines connecting the line units SLUR to the exchange discharge into interfaces AUBe in which a respective concentration (via concentrators CONC) of the traffic on a plurality of such multiplex lines occurs. These interfaces contain converter means ZE with which the FIG. 3 multiplex cells transmitted from the line units are converted into either short cells according to FIG. 2 or composite cells according to FIG. 3 or (insofar as the appertaining information is intended for forwarding to a further ATM exchange ATM-V) are converted into standard cells according to FIG. 1.

Figure 6:
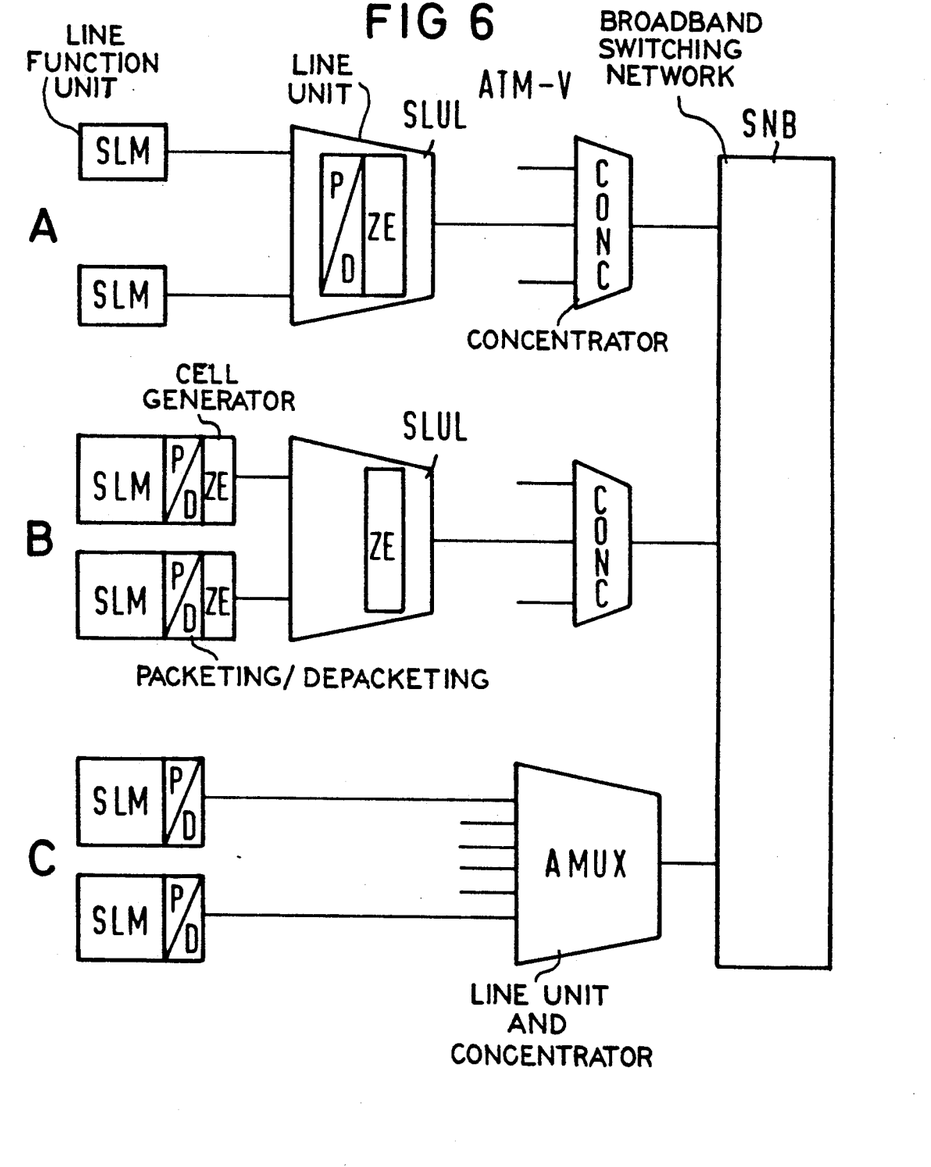
FIG. 6 is a block diagram of various versions of an ATM exchange wherein the connection of the subscriber lines occurs via line termination units belonging to the exchange.

FIG. 6 shows various versions of the conditions upon connection of subscriber lines carrying STM information via line units SLUL belonging to the exchange.

In the version A illustrated in the upper part of the FIG. 6, the packeting and depacketing of the STM information on the connected subscriber lines occurs centrally in the line unit SLUL. In the version B shown in the middle part of FIG. 6, the packeting/depacketing means are individually provided at the line termination side in the function units SLM. These function units also contain cell generators ZE wherein either multiplex cells according to FIG. 4 or short cells according to FIG. 2 are generated. Thus, in this case ATM information already arrives between the function units SLM and the line unit SLUL.

Both in version A as well as in version B, the line units SLUL contain cell generators ZE that generate message cells originally in the case of version A or by conversion in the case of version B, these message cells being either short cells according to FIG. 2 or composite cells according to FIG. 3. Due to the higher number of connected subscriber lines and the reduced number of destinations as a result thereof, the generation of composite cells is significantly more beneficial in this connection configuration in view of the utilization of the transmission capacity than would be the case for decentralized line units SLUR, for which reason the interim generation of multiplex cells according to FIG. 4 can be eliminated.

In order to fully utilize the connection capacity of the switching network SNB, a respective plurality of line units SLUR are combined by a concentrator CONC in versions A and B.

In version C, the functions of the line units SLUL and of the concentrator CONC are combined in a unit AMUX.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A telecommunication network having a plurality of switching centers composed of ATM exchanges and STM exchanges, the ATM exchanges of said plurality of switching centers operating on the basis of asynchronous through-connection of message packets in standard message cells of fixed length via virtual connections and the STM exchanges of said plurality of switching centers operating on the basis of synchronous circuit-switched through-connection, at least one predetermined ATM exchange of the ATM exchanges being capable of being connected to transmission lines connected to STM exchanges and/or subscriber lines connected to terminal equipment transmitting and receiving STM information in a STM mode, the STM information being in a plurality of time channels, comprising: means for receiving STM information in the plurality of time channels;

in the predetermined ATM exchange, means for packeting received STM information having a destination of one of an STM exchange or STM terminal equipment in at least one of short message cells and composite message cells, the short message cells being shorter than standard message cells transmitted between ATM exchanges of the plurality of switching centers, each short message cell having at least an information part containing message parts of one of the incoming time channels wherein the STM information is transmitted;

the composite message cells having the same length as the standard message cells transmitted between ATM exchanges of the plurality of switching centers, each composite message cell having at least an internal cell header and having an information part containing message parts of a plurality of incoming time channels that have a common destination of a switching network output of the predetermined ATM exchange, and means for multiplexing the message parts into the information part of the composite message cells;

means for interconnecting a plurality of subscriber lines carrying STM information to a multiplex line, the multiplex line being connected to said predetermined ATM exchange, said means for interconnecting having means for packeting STM information received on the subscriber lines in external message cells that have the same length as the standard message cells, each of the external message cells having at least an information part containing message parts of a plurality of time channels in which the STM information is transmitted, and having means for multiplexing the message parts into the information part of the external message cell irrespective of switching network output destinations of the STM information in the plurality of time channels; and in the predetermined ATM exchange, converter means connected to said multiplex line for converting said external message cells into one of said short message cells, said composite message cells with multiplexed message parts of time channels having a common destination, and said standard message cells.

2. The telecommunication network according to claim 1, wherein said means for interconnecting has means for packeting/depacketing STM information and means for multiplex cell generation connected to said means for packeting/depacketing.

3. The telecommunication network according to claim 2, wherein said means for interconnecting further has an STM narrowband switching stage connected between subscriber lines that are connected to narrowband subscribers and the means for packeting/depacketing in the means for interconnecting and an ATM broadband switching stage connected between the means for multiplex cell generation and the multiplex line, further subscriber lines carrying ATM information that are connected to broadband subscribers being also connected to said ATM broadband switching stage.

4. The telecommunication network according to claim 1, wherein said telecommunication network has a plurality of means for packeting/depacketing STM information and a plurality of means for cell generation, a respective means for packeting/depacketing and a respective means for cell generation connected to said respective means for packeting/depacketing forming a function unit of a plurality of function units that are individually allocated to subscriber lines connected to said means for interconnecting, and wherein said means for interconnecting has means for multiplex cell generation.

5. The telecommunication network according to claim 4, wherein the means for cell generation of the function units are multiplex cell generator units.

6. The telecommunication network according to claim 4, wherein the means for cell generation of the function units generate said short message cells.

7. The telecommunication network according to claim 4, wherein the means for cell generation of the function units generate message cells having a length of the standard message cells, the generated message cells having an information part that is only partially filled.

8. The telecommunication network according to claim 1, wherein the predetermined ATM exchange has at least one line unit for combining a plurality of subscriber lines respectively carrying STM information, one line unit having means for forming one of said short message cells having a shorter length than the standard message cells and said composite message cells that contain message parts of a plurality of incoming time channels having a common destination of a switching network output of the predetermined ATM exchange.

9. The telecommunication network according to claim 8, wherein said line unit has means for packeting/depacketing STM information and means for cell generation connected thereto.

10. The telecommunication network according to claim 8, wherein said telecommunication network has function units individually allocated to the subscriber lines connected to the line unit, each of said function units having means for packeting/depacketing STM information connected to one of means for short message cell generation and means for multiplex message cell generation.

11. A telecommunication network having a plurality of switching centers composed of ATM exchanges and STM exchanges, the ATM exchanges of said plurality of switching centers operating on the basis of asynchronous through-connection of message packets in standard message cells of fixed length via virtual connections and the STM exchanges of said plurality of switching centers operating on the basis of synchronous circuit-switched through-connection, at least one predetermined ATM exchange of the ATM exchanges being capable of being connected to transmission lines connected to STM exchanges and/or subscriber lines connected to terminal equipment transmitting and receiving STM information in a STM mode, the STM information being in a plurality of time channels, comprising:

means for receiving STM information in the plurality of time channels;

in the predetermined ATM exchange, means for packeting received STM information having a destination of one of an STM exchange or an STM terminal equipment in at least one of short message cells and composite message cells, the short message cells being shorter than standard message cells transmitted between ATM exchanges of the plurality of switching centers, each short message cell having at least an information part containing message parts of one of the incoming time channels wherein the STM information is transmitted, the composite message cells having the same length as the standard message cells transmitted between ATM exchanges of the plurality of switching centers, each composite message cells having at least an internal cell header and having an information part containing message parts of a plurality of incoming time channels that have a common destination of a switching network output of the predetermined ATM exchange, and means for multiplexing the message parts into the information part of the composite message cell;

means for interconnecting a plurality of subscriber lines carrying STM information to a multiplex line via a respective plurality of line units, the multiplex line being connected to said predetermined ATM exchange, and a plurality of means for packeting/depacketing STM information and a plurality of means for cell generation, a respective means for packeting/depacketing and a respective means for cell generation connected to said respective means for packeting/depacketing forming a function unit of the plurality of function units that are individually allocated to subscriber lines connected to said means for interconnecting, said means for interconnecting having means for multiplex cell generation; and in the predetermined ATM exchange, converter means connected to said multiplex line for converting said external message cells into one of said short message cells, said composite message cells with multiplexed message parts of time channels having a common destination, and said standard message cells.

12. The telecommunication network according to claim 11, wherein the means for cell generation of the function units are multiplex cell generator units.

13. The telecommunication network according to claim 11, wherein the means for cell generation of the function units generate said short message cells.

14. The telecommunication network according to claim 11, wherein the means for cell generation of the function units generate message cells having a length of the standard message cells, the generated message cells having an information part that is only partially filled.

15. A telecommunication network having a plurality of switching centers composed of ATM exchanges and STM exchanges, the ATM exchanges of said plurality of switching centers operating on the basis of asynchronous through-connection of message packets in standard message cells of fixed length via virtual connections and the STM exchanges of said plurality of switching centers operating on the basis of synchronous circuit-switched through-connection, at least one predetermined ATM exchange of the ATM exchanges being capable of being connected to transmission lines connected to STM exchanges and/or subscriber lines connected to terminal equipment transmitting and receiving STM information in a STM mode, the STM information being in a plurality of time channels, comprising:

means for receiving STM information in the plurality of time channels;

in the predetermined ATM exchange, means for packeting received STM information having a destination of one of an STM exchange or STM terminal equipment in at least one of short message cells and composite message cells, the short message cells being shorter than standard message cells transmitted between ATM exchanges of the plurality of switching centers, each short message cell having at least an information part containing message parts of one of the incoming time channels wherein the STM information is transmitted, the composite message cells having the same length as the standard message cells transmitted between ATM exchanges of the plurality of switching centers, each composite message cell having at least an internal cell header and having an information part containing message parts of a plurality of incoming time channels that have a common destination of a switching network output of the predetermined ATM exchange, and means for multiplexing the message parts into the information part of the composite message cell;

means for interconnecting a plurality of subscriber lines carrying STM information to a multiplex line, the multiplex line being connected to said predetermined ATM exchange, said means for interconnecting having means for packeting STM information received on the subscriber lines in external message cells that have the same length as the standard message cells, each of the external message cells having at least an information part containing message parts of a plurality of time channels in which the STM information is transmitted, and having means for multiplexing the message parts into the information part of the external message cell irrespective of switching network output destinations of the STM information in the plurality of time channels;

in the predetermined ATM exchange, converter means connected to said multiplex line in said predetermined ATM for converting said external message cells into one of said short message cells, said composite message cells with multiplexed message parts of time channels having a common destination, and said standard message cells; and in the predetermined ATM exchange, at least one line unit for combining a plurality of subscriber lines respectively carrying STM information, the line unit having means for forming one of said short message cells having a shorter length than the standard message cells and said composite message cells that contain message parts of a plurality of incoming time channels having a common destination of a switching network output of the predetermined ATM exchange.

16. The telecommunication network according to claim 15, wherein said means for forming has means for packeting/depacketing STM information and means for cell generation connected thereto.

17. The telecommunication network according to claim 15, wherein said telecommunication network has function units individually allocated to the subscriber lines connected to the line unit, each of said function units having means for packeting/depacketing STM information connected to one of means for short message cell generation and means for multiplex message cell generation.

* * * * *